United States Patent [19]

Gabrielli

[11] Patent Number: 4,621,408
[45] Date of Patent: Nov. 11, 1986

[54] SEQUENTIAL PHASE CONVERTIBLE MACHINE

[75] Inventor: Gino Gabrielli, Paris, France

[73] Assignees: Automobiles Citroen, Seine; Automobiles Peugeot, Paris, both of France

[21] Appl. No.: 698,764

[22] Filed: Feb. 6, 1985

[30] Foreign Application Priority Data

Feb. 10, 1984 [FR] France ................................ 84 02788

[51] Int. Cl.⁴ ............................................ B23Q 3/157
[52] U.S. Cl. ...................................... 29/568; 29/33 P; 29/563; 29/564
[58] Field of Search ............... 29/568, 564, 563, 33 K, 29/33 R, 33 P, 564.7, 56.5, 703

[56] References Cited

U.S. PATENT DOCUMENTS

| | | | |
|---|---|---|---|
| 3,543,392 | 12/1970 | Perry et al. | 29/564 X |
| 3,576,540 | 4/1971 | Fair et al. | 29/568 |
| 3,781,974 | 1/1974 | Hölzl et al. | 29/568 |
| 3,796,327 | 3/1974 | Meyer | 29/703 X |
| 3,909,922 | 10/1975 | Takasaki et al. | 29/563 |
| 4,461,068 | 7/1984 | Schneider et al. | 29/568 |

FOREIGN PATENT DOCUMENTS

| | | | |
|---|---|---|---|
| 110815 | 6/1984 | European Pat. Off. | 29/568 |
| 1627020 | 3/1970 | Fed. Rep. of Germany | 29/563 |
| 1254447 | 11/1971 | United Kingdom | 29/568 |
| 2077150 | 12/1981 | United Kingdom | 29/568 |

Primary Examiner—William R. Briggs
Attorney, Agent, or Firm—Karl F. Ross; Herbert Dubno

[57] ABSTRACT

A sequential phase convertible machine comprising at least one machining unit, but preferably two machining units placed opposite each other, a machining table which is provided with an undexable rotary plate and means for fixing the work pieces to be machined and which is disposed opposite the machining unit or between two machining units, conveyors adapted for moving supports on which the work pieces to be machined are fixed a magazine of machining boxes or heads adaptable to the machining units, and transport means adapted for taking said cases from the magazine and bringing them close to the machining unit or units as well as to return them then to the magazine, which machine further comprises means for effecting cyclic sequential or batch machining.

8 Claims, 3 Drawing Figures

SEQUENTIAL PHASE CONVERTIBLE MACHINE

FIELD OF THE INVENTION

The present invention relates to machines adapted for carrying out machining operations, for example milling, reaming, or boring.

BACKGROUND OF THE INVENTION

Machines for machining or tooling are generally divided into two types.

The machines of the first type, called transfer machines, comprise a conveyor on which the work pieces to be machined are placed and which conveys these work pieces in front of each machining unit. This type of machine, which is adapted for mass production requires considerable investment and must comprise as many machining units as there are operations to be carried out; a machine of this kind is generally only suitable for a single type of workpiece.

In the machines of the second type, which are called machining center or convertible machines, the work pieces are fixed and the different machining operations are effected successively from a machining unit or from several machining units working simultaneously, on which different machining boxes may be fitted successively.

It has already been proposed to operate the convertible machines sequentially with a transfer circuit for the machining boxes, so as to reduce the loading times for the boxes. In the machines of this kind at present constructed, a machining sequence ends by completion and discharge of a work piece.

SUMMARY OF THE INVENTION

The present invention provides a sequential phase convertible machine which is improved so as to reduce the time required for machining a series of work pieces, by eliminating as much as possible the unproductive time. This machine comprises at least one machining unit, but preferably two machining units disposed opposite one another, a machining table which is provided with an indexable rotary plate and means for fixing the work pieces to be machined and which is disposed opposite the machining unit or between the two machining units, conveyors adapted for moving supports on which the workpieces to be machined are fixed, a magazine of machining boxes or heads adaptable to the machining units, and transport means for taking the boxes from the magazine and bringing them near the machining unit or units as well as returning them then to the magazine.

The machine of the invention is characterized by the fact that it comprises means for carrying out cyclic sequential or batch machining.

Operating by batches reduces the number of box loading operations. When all the workpieces of a batch pass in front of the same boxes, the time lost is formed by the time required for loading the boxes and the sum of the passage times of the work pieces reduced by the passage time of one work piece for, during loading of the boxes, the passage time of the first work piece is screened.

In a particular embodiment of the invention, the machine comprises an internal machining circuit passing by the machining table and comprising, as required, as many supports with their workpieces as the batch comprises work pieces. With this arrangement, the work pieces of the same batch do not have to be taken out of the machine during a machining operation which uses several boxes.

The internal machining circuit may comprise a lowering means for bringing a workpiece which has just undergone a machining operation to a level situated below the machining table, from the work zones, and a raising means for bringing the workpiece back to the level of the table. Two work zones may for example be provided. In this case, the machine may provide for the machining of batches of five workpieces; one is waiting to be machined, another being machined, two others in the work zones and the last one in the raising or lowering means.

The machine may comprise two conveyors disposed parallel to the machining units, distributing means for passing each work piece from a conveyor to a machining circuit and from this machining circuit to a conveyor.

BRIEF DESCRIPTION OF THE DRAWING

One embodiment of a convertible machine in accordance with the invention will be described hereafter with reference to the accompanying schematic drawing in which.

SPECIFIC DESCRIPTION

Figure 1:
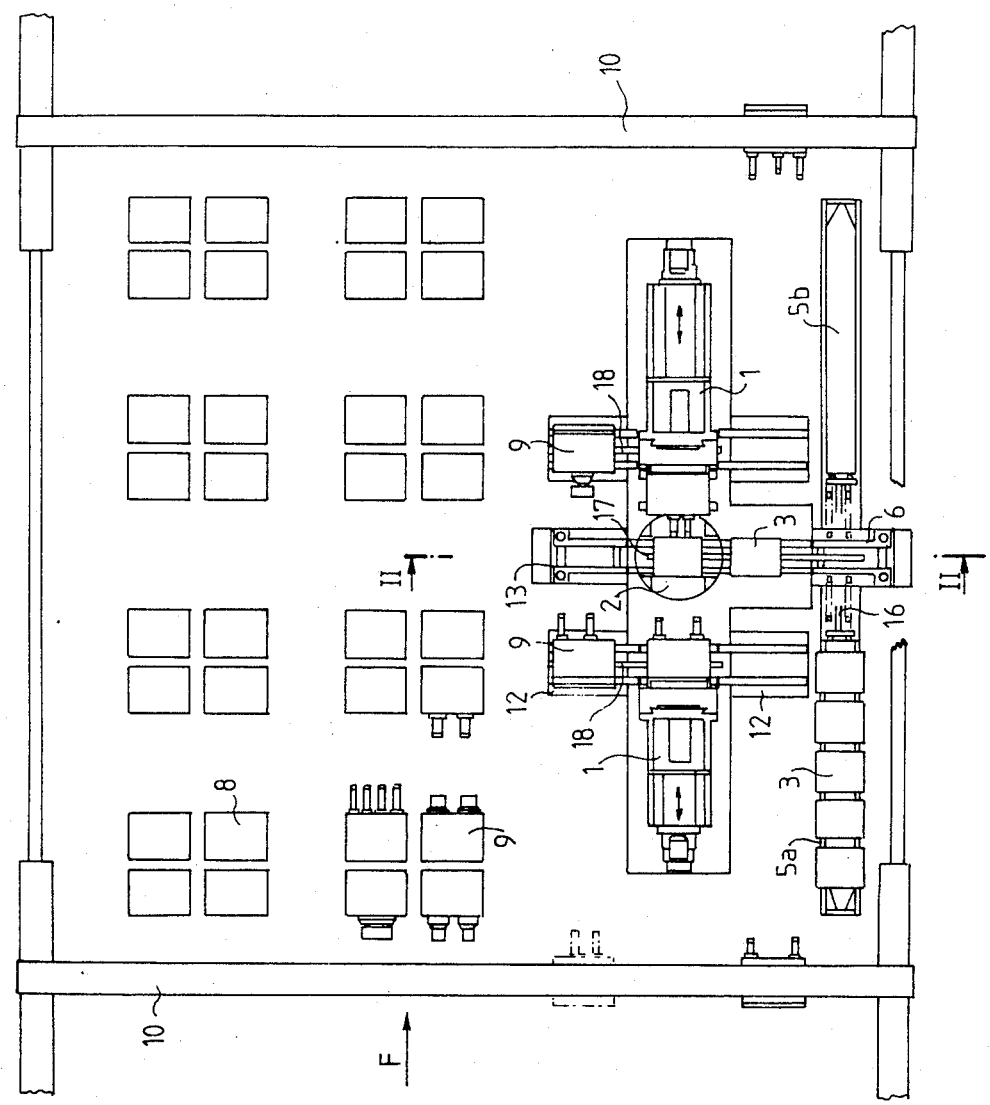
FIG. 1 is a top view of the machine.
Figures 2, 3:
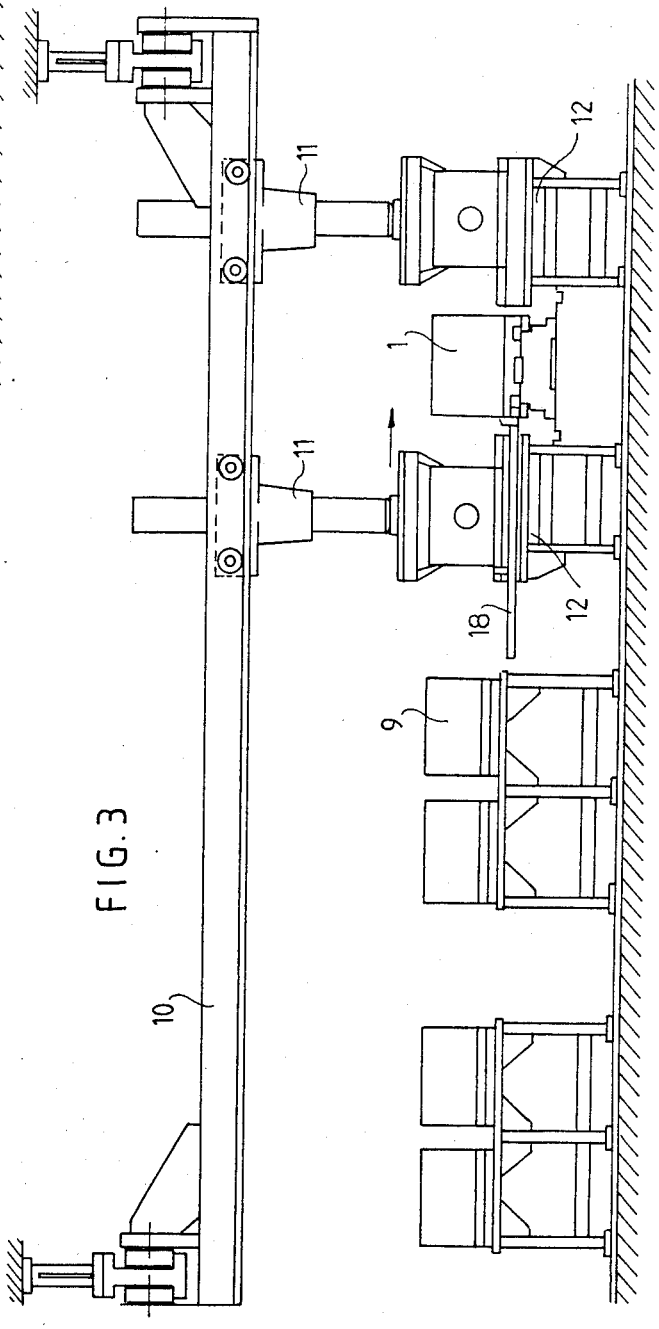
FIG. 2 is a section thereof along line II—II of FIG. 1.
FIG. 3 is a view thereof in the direction of arrow F in FIG. 1.

The convertible machine of the invention comprises two machining units 1 placed opposite each other and between which is disposed a table 2 with a rotary indexable plate. This table is intended to receive pallets each of which supports a workpiece to be machined, a pallet and the workpiece which it supports being designated in the drawing by the reference numeral 3, and is provided with clamping means 4 for holding a pallet-workpiece assembly on the table.

Two conveyors 5a and 5b for the pallets 3 are disposed parallel to the two machining units 1, on each side of a raising means 6 situated facing table 2.

The machine comprises a storage magazine 8 for machining boxes or heads 9 adaptable to the machining units 1, as well as an overhead travelling crane 10 having two lifting and lowering devices 11 for taking the boxes 9 from the storage magazine 8 and placing them on waiting tables 12 provided on each side of each machining unit 1 and, conversely, for picking up the boxes which have been used and bringing them back to the storage magazine. Bars 18, movable in translation, allow a machining box 9 to be brought from a machining table 12 to an adjacent machining unit and a box which has just been used to be brought back to a table 12.

The raising means 6 forms part of an internal machining circuit disposed in a plane perpendicular to the axis of the machining units 1 and comprising, besides the lifting means, a lowering means 13, this lowering means and the raising means 6 being disposed on each side of the axis of the table 2, and a horizontal circuit which passes under this table 2 and which may comprise a washing and blowing zone 14 as well as a zone 15 for removing cuttings.

A device 16 is provided for transferring a pallet with the workpiece which it supports from a conveyor 5a or 5b to the lifting means 6 in the high position and conversely from the lifting means on one of the conveyors. A bar 17 is provided for moving a pallet on the lifting means so as to bring it onto the table 2, or else for bringing a pallet from the table onto the lowering means 13.

The machine which has just been described is used in the following way.

Pallet-workpiece assemblies 3, in number equal to that of a batch, five for example, are disposed on one of the conveyors for example conveyor 5a.

Each of the pallets of the batch is brought successively onto the lifting means 6 in the high position, then onto table 2 where it is machined. After machining, it is replaced on table 2 by a second pallet of the batch when it passes into the lowering means 13; it then moves horizontally under the table, passing through the washing/blowing zone 14 and the cuttings removal zone 15, and is brought back into position by the raising means 6. The cycle is completed. If the machining is not finished, the pallet with its work piece undergoes another cycle with boxes 9 changed. This second cycle will be necessary for the five workpieces of the batch. If the machining is finished, it is discharged by the same conveyor 5a, then is immediately replaced by another pallet with its workpiece to be machined, coming from the conveyor 5b and belonging to another batch.

When the work pieces of the same batch are either in the inner circuit or on conveyor 5a which brought them and which then takes them up again, workpieces from the next batch are brought to the machining station or to the inner circuit from conveyor 5b. Each of the two conveyors ensures then alternately the supply of a batch, then removal thereof while the other conveyor ensures respectively removal of the preceding batch and the supply of the next batch.

Since each machining unit 1 comprises two waiting tables 12, one of them may be used for receiving a box 9 waiting to be fitted in the unit whereas the other may be used for receiving a box waiting to be returned to the magazine 8. All the boxes may thus be transported while another box is being used, without idle time.

Each pallet 3 is coded depending on the operation to be carried out, on its arrival in the machining zone 2; the code will be read and will give the instruction to the overhead travelling crane 10 to choose the box 9 capable of carrying out the operation.

It is obvious that the present invention should not be considered as limited to the embodiment described and shown but covers, on the contrary, all variants thereof.

What is claimed is:

1. A sequential phase convertible machine comprising two machining units placed opposite each other, a machining table between said units which is provided with an indexable rotary plate and means for fixing the workpieces to be machined, conveyors adapted for moving supports on which the workpieces to be machined are fixed, a magazine of machining heads adaptable to the machining units, and transport means adapted for taking said heads from the magazine and bringing them close to the machining units and returning them then to the magazine for effecting cyclic sequential or batch machining, means forming an internal machining circuit passing by the machining table and containing respective stations for supports with their workpieces equal in number to the number of workpieces in the batch, the means forming said internal machining circuit including a lowering means for bringing a workpiece, having undergone a machining operation, to a level situated below said machining table, and a raising means for bringing said workpiece back to a level of the table.

2. The machine as claimed in claim 1, comprising two conveyors disposed parallel to the machining unit, distributing means for causing each workpiece to pass from a conveyor to the machining circuit and from this machining circuit to a conveyor.

3. The machine as claimed in claim 1, wherein said machining circuit is situated in a plane perpendicular to the axis of the machining units.

4. The machine as claimed in claim 1, wherein each machining unit is provided on each side with at least two waiting tables for the boxes waiting to be used and the boxes waiting to be returned to store.

5. A machining apparatus which comprises:
a work table provided with a rotary indexable plate adapted to receive a workpiece assembly consisting of a workpiece and a support for said workpiece;
two machining units disposed on opposite sides of said table and formed with replaceable machining heads adapted to carry out respective machining operations of a workpiece of an assembly positioned on said plate;
a magazine containing a multiplicity of machining heads interchangeable with those of said units;
first transport means for selectively transferring machining heads from said magazine to said units;
second transport means for delivering a number of said assemblies forming a batch to a region of said table and for removing a batch of machined workpieces in their respective assemblies from a region of said table; and
means defining an internal circuit for each batch of said assemblies in the region of said table whereby, independently of said second transport means, assemblies of a batch transported into the region of said table are positioned on said plate and are removed from said plate while being displaced in a cyclical path, said path comprising a number of stations adapted to receive said assemblies and including said plate equal to the number of assemblies in the batch.

6. The apparatus defined in claim 5 wherein said means defining said internal circuit include stations located beneath said table and means on opposite sides of said table for raising and lowering said assemblies in said internal circuit.

7. The apparatus defined in claim 6 wherein said first transport means includes an overhead conveyor system for lifting and lowering said heads.

8. The apparatus defined in claim 7 wherein said second transport means includes a pair of horizontal conveyors cooperating with the means defining said internal circuit for transferring batches of said assemblies thereto and receiving batches of said assemblies from said internal circuit.

* * * * *